United States Patent
Lee et al.

(10) Patent No.: US 9,598,122 B2
(45) Date of Patent: Mar. 21, 2017

(54) STRUCTURE OF TAIL GATE GUIDE BUMPER USING MAGNETIC FORCE

(71) Applicant: Hyundai Motor Company, Seoul (KR)

(72) Inventors: Ho Sang Lee, Incheon (KR); Dahm Yoo, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/958,752

(22) Filed: Dec. 3, 2015

(65) Prior Publication Data

US 2016/0297485 A1   Oct. 13, 2016

(30) Foreign Application Priority Data

Apr. 10, 2015   (KR) .................. 10-2015-0050566

(51) Int. Cl.
*B62D 33/03* (2006.01)
*B62D 33/037* (2006.01)
*E05F 5/02* (2006.01)

(52) U.S. Cl.
CPC ............ *B62D 33/037* (2013.01); *E05F 5/022* (2013.01)

(58) Field of Classification Search
CPC ............ C12Q 1/705; C12Q 2537/137; C12Q 2545/101; C12Q 2525/131; C12Q 2525/161; C12Q 1/689; B60R 9/06; B60R 19/48; B60R 9/10; B60K 13/04
USPC .......................... 296/57.1, 50, 56, 26.11; 1/1
See application file for complete search history.

(56) References Cited

U.S. PATENT DOCUMENTS

| | | | | |
|---|---|---|---|---|
| 4,171,844 A | * | 10/1979 | Landaal | B62D 33/0273 296/57.1 |
| 4,461,325 A | * | 7/1984 | Palau | D03C 1/00 139/331 |
| 4,994,942 A | * | 2/1991 | Georgeff | B60Q 1/2607 362/368 |
| 5,542,807 A | * | 8/1996 | Kruzick | B60P 1/6463 414/491 |
| 6,119,306 A | * | 9/2000 | Antonucci | E05F 5/022 16/86 A |
| 8,056,965 B2 | * | 11/2011 | Rosemann | E05F 5/022 16/86 A |
| 2008/0073916 A1 | * | 3/2008 | Min | E05B 47/0603 292/201 |

(Continued)

FOREIGN PATENT DOCUMENTS

JP   2010-280358 A   12/2010
KR   20-0150527 Y1   7/1999

(Continued)

*Primary Examiner* — Kiran B Patel
(74) *Attorney, Agent, or Firm* — Morgan, Lewis & Bockius LLP

(57) ABSTRACT

A structure of a tail gate guide bumper using magnetic force may include one or more tail gate guide bumpers configured to be provided at a tail gate, and a vehicle body-side guide bumper provided at a vehicle body side at a position corresponding to the tail gate guide bumper, in which the tail gate guide bumper includes a permanent magnet, and the vehicle body-side guide bumper includes an electromagnet, and a polarity of the electromagnet may be controlled, so that the electromagnet exerts repulsive force and gravitation force with respect to the permanent magnet of the tail gate guide bumper in response to opening and closing of the tail gate.

6 Claims, 4 Drawing Sheets

(56) References Cited

U.S. PATENT DOCUMENTS

2013/0219658 A1* 8/2013 Krajewski ............... E05F 5/022
                                                              16/82
2014/0091600 A1* 4/2014 Lusky .................... E05F 5/022
                                                              296/207

FOREIGN PATENT DOCUMENTS

| KR | 10-0224191 B1   | 10/1999 |
|----|-----------------|---------|
| KR | 10-2004-0093286 A | 11/2004 |
| KR | 10-2005-0112422 A | 11/2005 |
| KR | 10-0527432 B1   | 11/2005 |
| KR | 10-0534433 B1   | 12/2005 |

* cited by examiner

STRUCTURE OF TAIL GATE GUIDE BUMPER USING MAGNETIC FORCE

CROSS-REFERENCE TO RELATED APPLICATION

The present application claims priority to Korean Patent Application No. 10-2015-0050566 filed Apr. 10, 2015, the entire contents of which is incorporated herein for all purposes by this reference.

BACKGROUND OF THE INVENTION

Field of the Invention

The present invention relates to a structure of a tail gate guide bumper using magnetic force, and more particularly, to a structure of a tail gate guide bumper using magnetic force, which absorbs a horizontal movement of a tail gate and decreases noise by using an electromagnet interworked when the tail gate is opened and closed.

Description of Related Art

In general, a tail gate is installed at a rear part of a Sport Utility Vehicle (SUV) to be opened and closed, and a guide bumper is installed in a combination lamp housing panel, which is in contact with the tail gate, so as to prevent impact or vibration when the tail gate is opened and closed.

Prior art (related art) tail gate guide bumpers disclose a structure of a guide bumper having an "over-slam bumper function" including a first guide bumper mounted in a tail gate panel of a vehicle by a fitting method, a second guide bumper mounted in a body panel of the vehicle by a fitting method, in such a manner the second guide bumper flows while being in surface contact with the first guide bumper when a tail gate is closed, a bumper support positioned on a rear surface of the second guide bumper; and a bumper string, of which both ends are coupled with the bumper support and the body panel, and which returns the second guide bumper to an original position while preventing friction noise according to the surface contact when the second guide bumper moves with the surface contact with the first and second guide bumper.

Other prior art tail gate guide bumpers disclose an over-slam bumper including a fixed base member, a striking member limiting a striking surface and accommodating a load applied thereon, and a link member connecting the base member and the striking member.

The over-slam bumper in the related art is formed by simply fixing synthetic rubber or plastic members to the tail gate panel and the body panel of the vehicle at opposed positions, and may be deformed by repeatedly applied impact according to a use, so that there is a problem in that clearance is increased to increase noise and degrade durability.

Further, the prior art discloses an electronic guide bumper apparatus for preventing movement of a tail gate, in which, as schematically illustrated in FIGS. 1 and 2, in order to maintain an optimum state of repulsive power with respect to a tail gate and increase an overlap quantity with a stopper, a solenoid 20 is mounted in a guide bumper 12 so as to receive power of a battery 13 for a predetermined time (about 10 seconds) set by a time delay 30 and vertically move the guide bumper 12 when a switch 14 is turned on and the tail gate is opened, and receive power of the battery 13 and prevent the tail gate from moving when a speed of a vehicle detected by a vehicle sensor 15 is equal to or larger than a predetermined speed (about 20 km/h), and a spring 21, which returns the moved guide bumper 12 to an original position when power of the battery 13 is blocked, is provided at the solenoid 20, and a control switch controlling a supply of the power of the battery 13 is connected to the solenoid 20.

However, in the electronic guide bumper apparatus of the patent technology, when a vehicle speed exceeds a predetermined range, the power supply is connected to the solenoid to ascend the guide bumper, so that a gap between the guide bumper at a vehicle body side and the guide bumper at the tail gate side is decreased to prevent a movement of the tail gate and decrease noise, but in this case, closing force is increased when a driver closes the tail gate, so that the driver needs to apply large force.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a structure of a tail gate guide bumper using an electromagnet, which is controlled so that a magnet at a vehicle body side has the same polarity as that of a magnet provided at a tail gate so as to easily open the tail gate when a driver opens the tail gate, and the magnet at the vehicle body side has an opposite polarity as that of the magnet of the tail gate so as to maintain the tail gate in a state of being in close contact with the vehicle body when the driver closes the tail gate.

According to various aspects of the present invention, a structure of a tail gate guide bumper using magnetic force may include one or more tail gate guide bumpers configured to be provided at a tail gate, and a vehicle body-side guide bumper provided at a vehicle body side at a position corresponding to the tail gate guide bumper, in which the tail gate guide bumper includes a permanent magnet, and the vehicle body-side guide bumper includes an electromagnet, and a polarity of the electromagnet may be controlled, so that the electromagnet exerts repulsive force and gravitation force with respect to the permanent magnet of the tail gate guide bumper in response to opening and closing of the tail gate.

A polarity of the electromagnet of the vehicle body-side guide bumper may be changed by a current flow control of a body control module (BCM) in response to the opening/closing of the tail gate.

The electromagnet of the vehicle body-side guide bumper may be controlled so as to have an opposite polarity to the polarity of the permanent magnet of the tail gate guide bumper, so that the tail gate is maintained while being in close contact with the vehicle body side by magnetic force when the tail gate is closed, and to have the same polarity as the polarity of the permanent magnet, so that the tail gate is separated from the vehicle body by repulsive force when the tail gate is opened.

The electromagnet may be buried in the vehicle body-side guide bumper by insert molding.

When a tail gate open switch is pressed or the tail gate is opened by a lever, the body control module may be configured to detect a latch locking release signal, and control a current of an external surface of the electromagnet mounted at the vehicle-body side to flow from a first end to a second end of a coil of the electromagnet so that the external surface of the electromagnet has the same polarity as the polarity of the permanent magnet of the tail gate.

When the tail gate is closed, the body control module may be configured to detect a latch locking signal through a sensor, and control a current to flow from a second end to a first end of a coil in the electromagnet of the vehicle body-side guide bumper, so that the electromagnet of the vehicle body-side guide bumper has an opposite polarity to that of the permanent magnet of the tail gate.

According to the structure of the tail gate guide bumper using magnetic force according to the present invention, it is possible to easily open the tail gate when the tail gate provided with the permanent magnet is opened by controlling a polarity of the electromagnet of the vehicle body-side guide bumper, and closing force is increased when the tail gate is closed and thus the tail gate is in close contact with the tail gate guide bumper, so that it is possible to prevent the tail gate from moving and decrease noise while a vehicle travels, thereby improving a quality and decreasing complaints.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
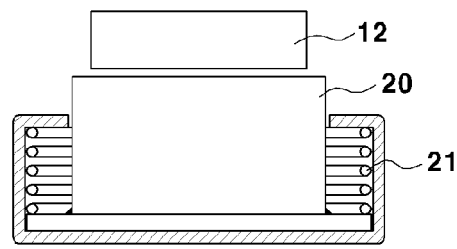
FIG. 1 is a diagram schematically illustrating a configuration of a tail gate guide bumper of a vehicle in the related art.
Figure 2:
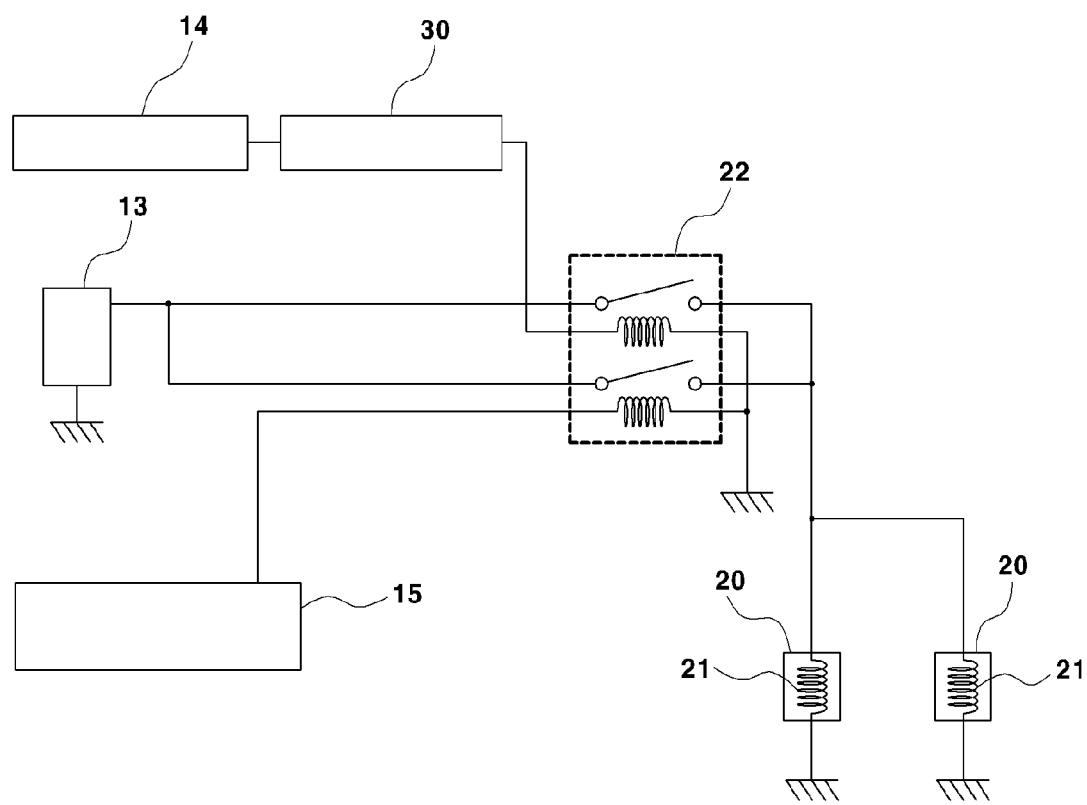
FIG. 2 is a circuit diagram of an operation of the exemplary tail gate guide bumper apparatus of FIG. 1.
Figure 3:
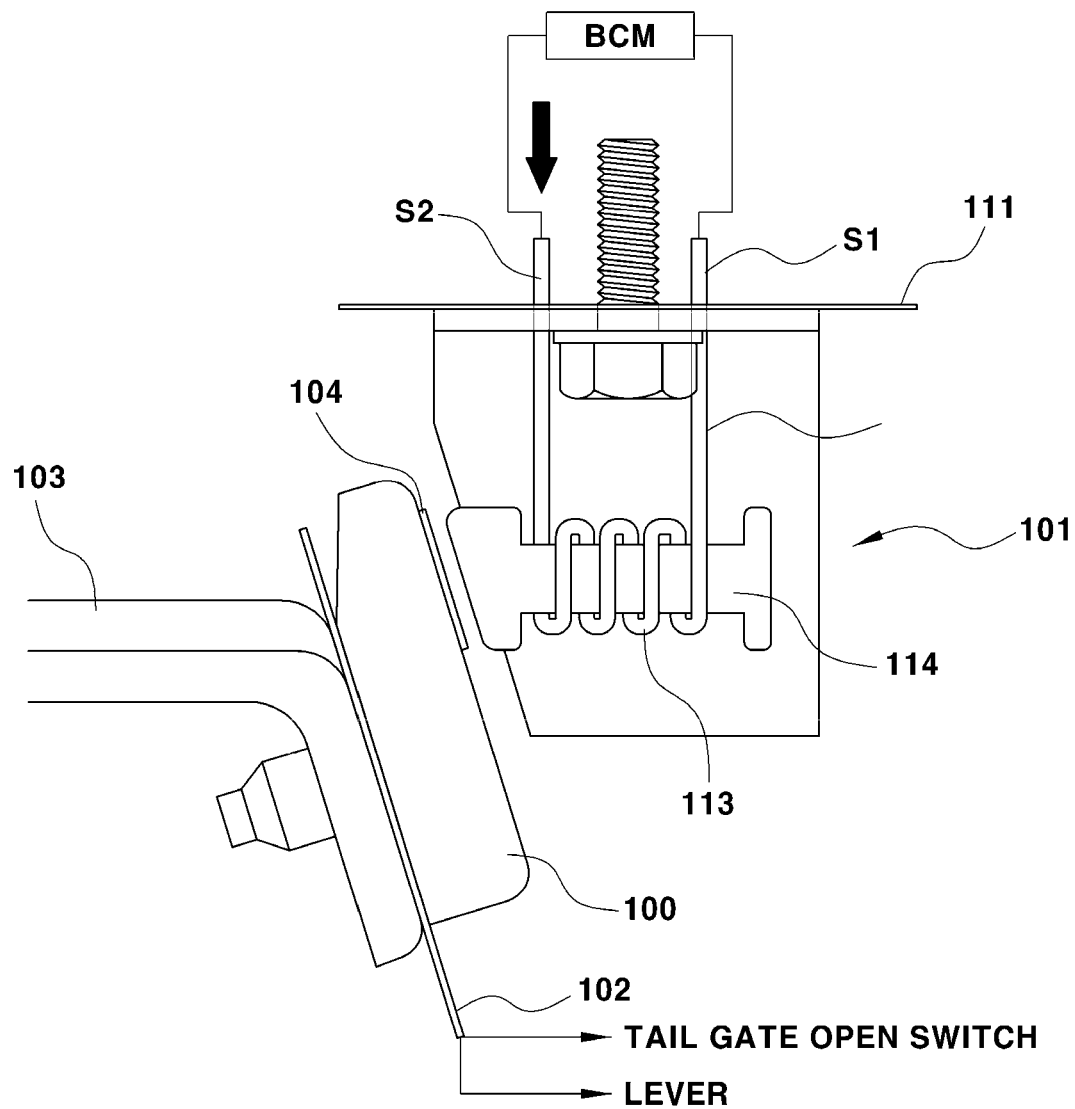
FIG. 3 is a diagram illustrating a state when a tail gate of guide bumpers installed at a vehicle body side is opened in an exemplary tail gate guide bumper apparatus according to the present invention.
Figure 4:
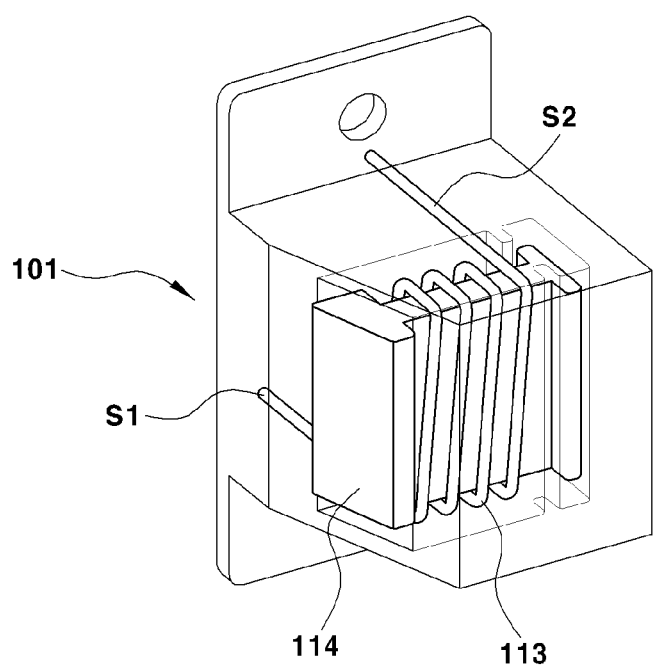
FIG. 4 is a perspective view schematically illustrating an internal configuration of the guide bumper at the vehicle body side of the exemplary tail gate guide bumper apparatus of a vehicle according to the present invention of FIG. 3.
Figure 5:
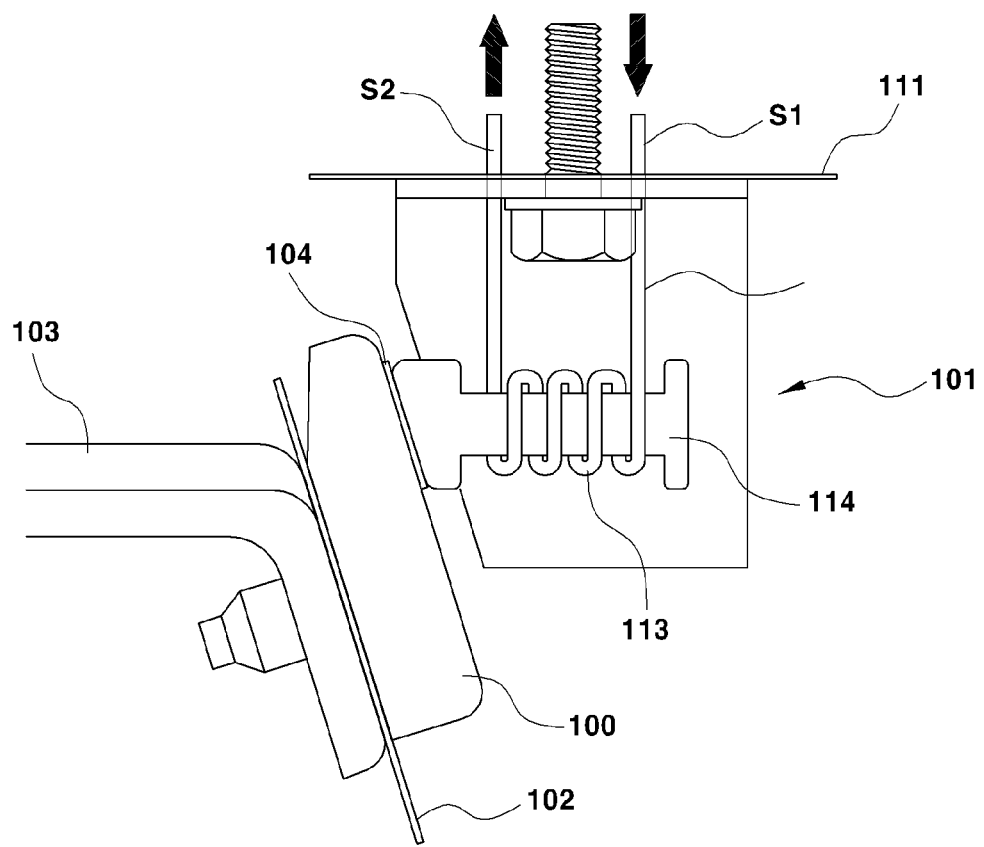
FIG. 5 is a cross-sectional diagram illustrating a state of the guide bumpers of the exemplary tail gate guide bumper apparatus when the tail gate closes the vehicle body side.

Referring to FIGS. 3 to 5, a structure of a tail gate guide bumper using magnetic force according to the present invention includes tail gate guide bumpers 100 provided both sides of a tail gate 102, and vehicle body-side guide bumpers 101 provided at a vehicle side at a position corresponding to each guide bumper 100 when the tail gate 102 is closed.

The tail gate guide bumper 100 is mounted on an external surface of an inner panel through a guide bumper bracket 103 installed on an internal surface of the inner panel 102, and a permanent magnet 104 is fixed to an external surface of the tail gate guide bumper 100 so as to be an, for example, an "N" electrode. The permanent magnet 104 may be fixed to the tail gate guide bumper 100 by a general method, for example, a method using an adhesive, by insert molding so as to be partially buried, or by other fastening means.

The vehicle body-side guide bumper 100 corresponding to the tail gate guide bumper 100 is fixed to protrude from an external side of an outer panel of a vehicle body 111, and an electromagnet 114, of which a circumference of an external surface is wound with a coil 113, is embedded in the guide bumper 101, and a polarity of the coil 113 connected to a power supply is controlled by a Body Control Module (BCM).

The vehicle body-side guide bumper 101 may be manufactured in a structure, in which the electromagnet 114 is buried therein by insert molding.

When a tail gate open switch is pressed or the tail gate 102 is opened by a lever, the BCM detects a latch locking release signal, and controls a current of the external surface of the electromagnet 114 mounted at the vehicle-body side to flow from one end S2 to the other end S1 of the coil 113, so that the external surface of the electromagnet 114 has the "N" polarity, which is the same as that of the permanent magnet 104 of the tail gate 102. The tail gate open switch and the lever are generally provided in a driver seat area to allow a driver to open the tail gate 102 or a back door or trunk of a vehicle.

As described above, when the tail gate 102 is opened, the tail gate guide bumper 100 and the vehicle body-side guide bumper 101 have the same polarity (N), so that the tail gate 102 may be easily opened by repulsive force.

Further, when the tail gate 102 is closed, the BCM detects a latch locking signal through a sensor, and controls a current to flow from the other end S1 to one end S2 of the coil in the electromagnet 114 of the vehicle body-side guide bumper 101, so that the electromagnet 114 of the vehicle body-side guide bumper 101 has an "S" polarity, which is the opposite polarity to that of the permanent magnet 104 of the tail gate 102, and thus the tail gate 102 is maintained in a state of being in close contact with the vehicle body-side guide bumper by magnetic force, thereby minimizing rattle noise by the tail gate 102 while the vehicle travels.

The structure of the tail gate guide bumper using magnetic force according to the present invention may be simply used without a large modification of an existing configuration so as to decrease a movement and noise of a vehicle body-side guide bumper and a tail gate guide bumper in a tail gate of an SUV vehicle and a back door of a box-shaped vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure of a tail gate guide bumper using magnetic force, comprising:
   one or more tail gate guide bumpers configured to be provided at a tail gate; and
   a vehicle body-side guide bumper provided at a vehicle body side at a position corresponding to the tail gate guide bumper,
   wherein the tail gate guide bumper includes a permanent magnet, and
   the vehicle body-side guide bumper includes an electromagnet, and a polarity of the electromagnet is controlled, so that the electromagnet exerts repulsive force and gravitation force with respect to the permanent magnet of the tail gate guide bumper in response to opening and closing of the tail gate.

2. The structure of claim 1, wherein a polarity of the electromagnet of the vehicle body-side guide bumper is configured to be changed by a current flow control of a body control module (BCM) in response to the opening and closing of the tail gate.

3. The structure of claim 2, wherein the electromagnet of the vehicle body-side guide bumper is controlled so as to have an opposite polarity to the polarity of the permanent magnet of the tail gate guide bumper, so that the tail gate is maintained while being in close contact with the vehicle body side by magnetic force when the tail gate is closed, and to have the same polarity as the polarity of the permanent magnet, so that the tail gate is separated from the vehicle body by repulsive force when the tail gate is opened.

4. The structure of claim 1, wherein the electromagnet is buried in the vehicle body-side guide bumper by insert molding.

5. The structure of claim 2, wherein when a tail gate open switch is pressed or the tail gate is opened by a lever, the body control module is configured to detect a latch locking release signal, and control a current of an external surface of the electromagnet mounted at the vehicle-body side to flow from a first end to a second end of a coil of the electromagnet so that the external surface of the electromagnet has the same polarity as the polarity of the permanent magnet of the tail gate.

6. The structure of claim 2, wherein when the tail gate is closed, the body control module is configured to detect a latch locking signal through a sensor, and control a current to flow from a second end to a first end of a coil in the electromagnet of the vehicle body-side guide bumper, so that the electromagnet of the vehicle body-side guide bumper has an opposite polarity to that of the permanent magnet of the tail gate.

* * * * *